United States Patent
Ricketts

(10) Patent No.: US 6,613,229 B2
(45) Date of Patent: Sep. 2, 2003

(54) WASTE TREATMENT METHOD AND APPARATUS WITH DENITRIFICATION CHAMBER

(75) Inventor: Donald D. Ricketts, Monterey, VA (US)

(73) Assignee: Wastewater Technology, Inc., Monterey, VA (US)

(*) Notice: Subject to any disclaimer, the term of this patent is extended or adjusted under 35 U.S.C. 154(b) by 19 days.

(21) Appl. No.: 09/784,033

(22) Filed: Feb. 16, 2001

(65) Prior Publication Data

US 2002/0113011 A1 Aug. 22, 2002

(51) Int. Cl.[7] ............... C02F 3/08; C02F 3/30
(52) U.S. Cl. .......... 210/605; 210/679; 210/624; 210/626; 210/151; 210/195.3; 210/903
(58) Field of Search ............... 210/605, 619, 210/623, 624, 626, 630, 150, 151, 195.1, 195.3, 197, 903

(56) References Cited

U.S. PATENT DOCUMENTS

| | | | | |
|---|---|---|---|---|
| 4,028,245 A | | 6/1977 | Stahler | |
| 4,315,821 A | * | 2/1982 | Climenhage | 210/605 |
| 4,655,925 A | * | 4/1987 | Tabata et al. | 210/605 |
| RE32,429 E | * | 6/1987 | Spector | 210/605 |
| 5,128,029 A | | 7/1992 | Herrmann | |
| 5,248,422 A | * | 9/1993 | Neu | 210/619 |
| 5,288,406 A | * | 2/1994 | Stein | 210/903 |
| 5,326,459 A | * | 7/1994 | Hlavach et al. | 210/150 |
| 5,643,453 A | * | 7/1997 | Pannier et al. | 210/605 |
| 6,007,712 A | * | 12/1999 | Tanaka et al. | 210/151 |
| 6,039,873 A | | 3/2000 | Stahler | |
| 6,325,933 B1 | * | 12/2001 | Nielsen et al. | 210/624 |

* cited by examiner

Primary Examiner—Christopher Upton
(74) Attorney, Agent, or Firm—Stevens, Davis, Miller & Mosher, L.L.P.

(57) ABSTRACT

A waste treatment method and apparatus including a denitrification chamber for denitrifying waste, an aeration basin for aerating the waste, and a clarifying device in which sludge particles separate out of the waste, leaving discharge and reusable sludge. Sludge from the clarifying device is sent back to the denitrification chamber or aeration basin or both. Sludge on the aeration basin floor is sent back to the denitrification chamber. Preferably, the method and apparatus facilitate both activated sludge and fixed film processes. Most preferably, the clarifying device comprises a constant flow backwash filter.

32 Claims, 3 Drawing Sheets

WASTE TREATMENT METHOD AND APPARATUS WITH DENITRIFICATION CHAMBER

BACKGROUND OF THE INVENTION

1. Field of the Invention

The invention relates to biological treatment of waste through activated sludge and fixed film processes.

2. Description of the Prior Art

Biological treatment of wastewater usually employs either activated sludge or fixed film. Activated sludge is the semi-liquid biomass removed from the liquid flow of wastewater. Before it is fully decomposed by aerobic microbial decomposition, activated sludge is put into aeration tanks to facilitate and further undergo aerobic microbial decomposition. Fixed film reactors use biological aerators that rotate around a central horizontal shaft, which is submerged in wastewater. As the aerators reemerge from the surface of the wastewater, they catch air in specially profiled cells.

A typical activated sludge or fixed film apparatus uses an aeration basin, also referred to as an aeration tank or biotank. The aeration basin provides the oxic environment necessary for nitrification with the activated sludge and fixed film, which use nitrifying bacteria such as nitrosomonas and nitrobacter. Denitrification, however, must occur in an anoxic environment. Therefore, nitrification and denitrification are generally incompatible in the same environment. See U.S. Pat. No. 6,039,873, to Stahler, the entire disclosure of which is herein incorporated by reference. Denitrification also requires a source of carbon as food for the denitrifying bacteria.

A typical activated sludge or fixed film apparatus also uses a separate gravity clarifier, sometimes referred to as a settling tank or gravity separator. The purpose of the clarifier is to remove the suspended solid particles in the wastewater. The solid particles range in size from microscopically fine to rather coarse, and consist primarily of undissolved or unoxidized material, spent bacteria and other microorganisms. The clarifier is usually one of a number of types, including circular, hopper bottom or rectangular.

Once separated from the supernatant liquor, the solid particles settle to the bottom of the clarifier to form sludge. The sludge is then returned to the aeration basin by a return sludge pump. The sludge, which contains viable bacteria and microorganisms, reacts with the wastewater in the aeration basin to further the activated sludge process. The rate of return can vary widely in proportion to the rate of influent flow. Typical rates are 25–100 percent of the influent flow.

Conventional clarifiers, however, require a great deal of space and are difficult to transport. Furthermore, they do not work well where there is a great deal of movement, such as on board a ship. They also make it difficult to precisely control the amount of solids in the effluent.

In addition, prior art systems generally use either a fixed film process or an activated sludge process, thereby foregoing the advantages of the other process. Specifically, the fixed film process is simpler, and provides more stable treatment with lower power costs, while activated sludge is more flexible and meets higher quality effluent standards.

SUMMARY OF THE INVENTION

The present invention comprises a waste treatment method and apparatus. The apparatus includes a denitrification chamber that receives waste, typically wastewater, through a first conduit and contains the wastewater along with sludge. The mixture of waste and sludge is referred to as mixed liquor. The mixed liquor is eventually discharged through a second conduit into an aeration basin. The aeration basin includes an aerating device for aerating the mixed liquor. Lighter aerated mixed liquor leaves the aeration basin through a third conduit, preferably located near the top of the aeration basin, and enters a clarifying device. The aeration basin includes a fourth conduit for discharging sludge into the denitrification chamber. The clarifying device separates solid particles from the mixed liquor, resulting in sludge and discharge water. The discharge water is discharged through a fifth conduit as effluent and the sludge is discharged through a sixth conduit into the denitrification chamber or the aeration basin or both.

Preferred embodiments of the apparatus further comprise one or more of the features selected from among the following: a first pump to assist the discharge of sludge through the fourth conduit; an intake mechanism for the first pump that intakes sludge near an expanse of a floor of the aeration basin; a filter apparatus that acts as the clarifying device; a filter apparatus that includes a constant backwash filter; a filter apparatus that includes an air compressor; a filter apparatus with an air compressor capable of generating pressure that helps discharge sludge through the sixth conduit; a conduit arrangement wherein the sludge discharged through the sixth conduit is discharged into the aeration basin, i.e., the sixth conduit terminates in, above or near the aeration basin; a conduit arrangement wherein the sludge discharged through the sixth conduit is discharged into the denitrification chamber, i.e., the sixth conduit terminates in, above or near the the denitrification chamber; a conduit arrangement wherein the fourth conduit and the sixth conduit meet at a junction before they release sludge into the denitrification chamber; a conduit arrangement wherein the sixth conduit is attached to the junction via a venturi; wherein the junction includes a nozzle through which mixed sludge may be released; a second pump that capable of mixing of sludge and waste in the denitrification chamber; a conduit arrangement wherein the second pump is operably connected to the junction of conduits; a conduit arrangement wherein one end of the first conduit is within three feet of the nozzle; the aerating device is a rotary aerator; and/or the apparatus includes both (a) fixed film and fixed film microorganisms and (b) activated sludge and activated sludge microorganisms.

In alternative preferred embodiments, the apparatus comprises a third pump capable of assisting the discharge of sludge through the sixth conduit. The third pump may include an intake mechanism for transferring of sludge from the clarifier to the sixth conduit. These alternative embodiments may have one or more of the additional features listed in the paragraph above. However, at least one of these alternative embodiments envisions the use of a gravity clarifier in place of the filter apparatus mentioned above.

The method of the invention includes one or more of the steps of directing waste through a first conduit and into a denitrification chamber where the waste mixes with sludge to form a mixed liquor; directing mixed liquor that has undergone denitrification in the denitrification chamber through a second conduit and into an aeration basin; aerating the mixed liquor in the aeration basin with an aerating device; directing aerated mixed liquor through a third conduit and into a clarifying device capable of separating solid particles from the mixed liquor; directing sludge that collects in the aeration basin through a fourth conduit and into the denitrification chamber; removing solid particles from the mixed liquor directed into the clarifying device to form recycled sludge and discharge water; directing the discharge water through a fifth conduit as effluent; and directing the recycled sludge through a sixth conduit and into either or both the denitrification chamber or the aeration basin.

In preferred embodiments, the method further comprises treating the waste with both (a) fixed film and fixed film microorganisms and (b) activated sludge and activated sludge microorganisms. It is also preferable to separate the particles from the mixed liquor in the clarifying device through constant flow backwash filtering. In more preferred embodiments, the aerating comprises rotating a rotary aerator in the aeration basin. In still more preferred embodiments, directing basin return sludge through the fourth conduit includes pumping it through the fourth conduit and directing clarifier sludge through the sixth conduit includes pumping it through the sixth conduit. Most preferred embodiments comprise mixing in the denitrification chamber the incoming sludge and the incoming waste.

The method and apparatus of the invention will be better understood by reference to the appended drawings and the following description.

DETAILED DESCRIPTION OF THE PREFERRED EMBODIMENTS

Figure 1:
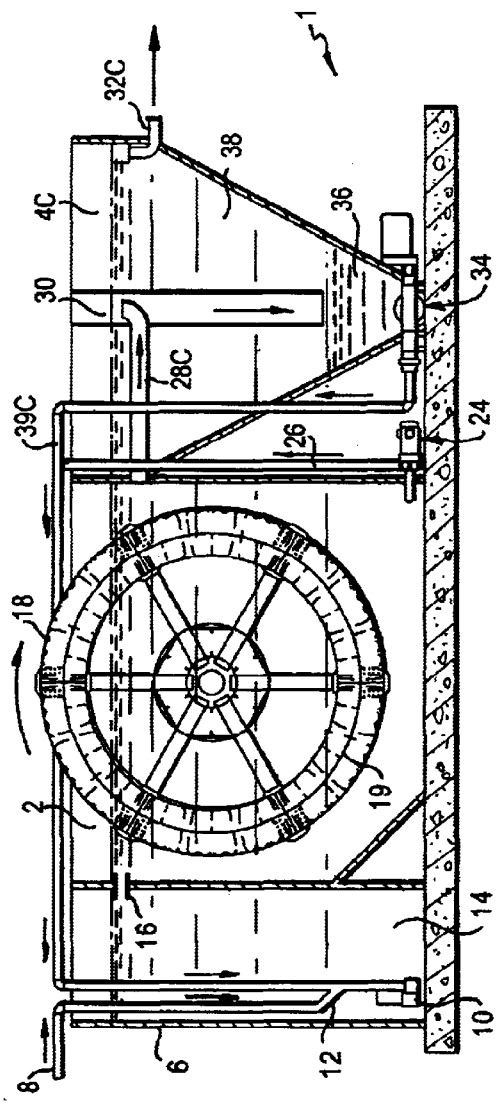
FIG. 1 is a cross-sectional side view of an embodiment of the apparatus with a conventional clarifier.

FIG. 1 depicts a cross-sectional side view of waste treatment apparatus 1 (hereinafter "apparatus 1") including aeration basin 2 with conventional clarifier 4C at one end and denitrification chamber 6 at the other.

New incoming wastewater first enters into denitrification chamber 6 through wastewater influent conduit 8 (also referred to as the first conduit). Denitrification chamber 6 is a low oxygen environment that holds mixed liquor 14, which is primarily a mixture of wastewater and sludge. Denitrification chamber 6 preferably contains mixing pump 10 (also referred to as the second pump) and conduit junction 12 for mixing incoming recycled sludge. Denitrification chamber 6 has an opening 16 (also referred to as the second conduit) near its top edge so that overflow will proceed to aeration basin 2.

Mixed liquor 14 is aerated in aeration basin 2. Air is introduced into aeration basin 2 by rotary aerator 18. A motor (not shown), preferably a variable speed electric gear motor, drives rotary aerator 18 with a chain drive. As air cells 19 on rotary aerator 18 rotate out of mixed liquor 14, they fill with air. After re-submerging beneath the surface, air cells 19 disperse that air evenly throughout their rotation through mixed liquor 14, preferably depleting their supply just as they re-approach the surface on their rearward upstroke. The speed of rotation can be controlled by varying the speed of the motor, thereby permitting control of the rate of depletion of the air in air cells 19.

Aeration basin 2, however, contains a number of zones ranging in oxygen content. Low oxygen mixed liquor 14 and sludge particles tend to settle to the floor of aeration basin 2 to form basin return sludge 22 (not shown). Located near the floor of aeration basin 2, re-circulation pump 24 (also referred to as the first pump) directs basin return sludge 22 through re-circulation conduit 26 (also referred to as the fourth conduit) and into conduit junction 12 where it mixes with sludge from clarifier 4C and empties into denitrification chamber 6, where the mixture mixes with wastewater. Mixing pump 10 (also referred to as the second pump) is functionally connected to tube junction 12 to further facilitate mixing.

Lighter aerated mixed liquor 14, which tends to reside closer to the top of aeration basin 2, enters clarifier 4C through influent conduit 28C (also referred to as the third conduit). Clarifier 4C comprises agitation guard 30, effluent conduit 32C (also referred to as the fifth conduit) and sludge return pump 34 (also referred to as the third pump). Clarifier 4C is substantially filled with clarifier sludge 36 and supernatant 38. Incoming mixed liquor 14 first travels down through agitation guard 30 and toward the settling area of clarifier 4C. The solid particles in mixed liquor 14 then settle out to form clarifier sludge 36. The remaining supernatant 38 exits through effluent conduit 32C. Meanwhile, clarifier sludge 36 enters return sludge pump 34. Return sludge pump 34 directs clarifier sludge 36 through clarifier sludge return conduit 39C (also referred to as the sixth conduit) to conduit junction 12, where it mixes with basin return sludge 22 and empties into denitrification chamber 6, where the mixture mixes with wastewater.

Figure 2:
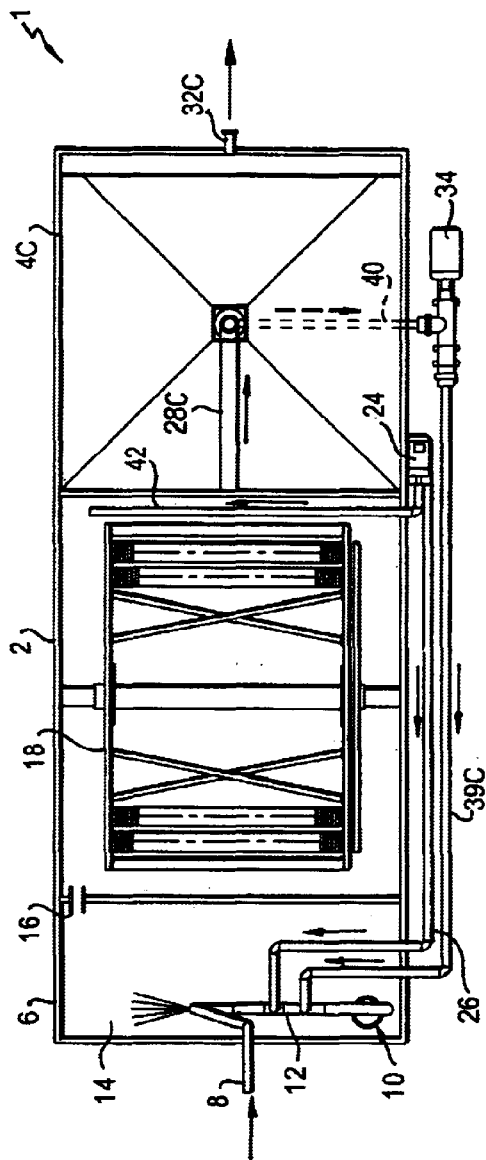
FIG. 2 is a plan view of an embodiment of the apparatus of FIG. 1 with a conventional clarifier.

FIG. 2 is a plan view of apparatus 1 including aeration basin 2 with conventional clarifier 4C at one end and denitrification chamber 6 at the other. In clarifier 4C, FIG. 2 additionally shows that sludge return pump 34 includes clarifier sludge intake tube 40. In aeration basin 2, FIG. 2 additionally shows that re-circulation pump 24 includes floor sludge intake vacuum 42. Intake vacuum 42 enables intake of sludge from across a wide expanse of the floor of aeration basin 2.

Figure 3:
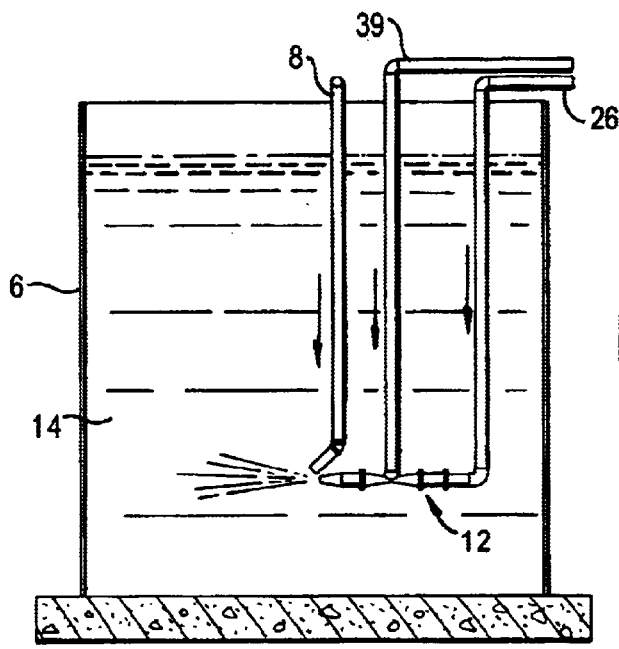
FIG. 3 is a cross-sectional side view of a denitrification tank and tube junction without mixing pump, according to the invention.

FIG. 3 is a cross-sectional side view of denitrification tank 6 and conduit junction 12 without mixing pump 10. FIG. 3 additionally shows the stream of wastewater from wastewater influent conduit 8 being directed into the stream of sludge from conduit junction 12.

Figure 4:
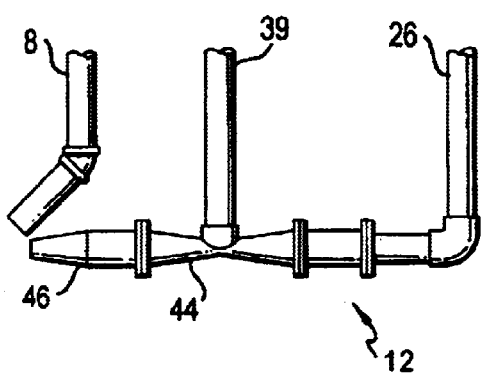
FIG. 4 is a perspective view of the tube junction of FIG. 3 configured without a mixing pump.

FIG. 4 is a close-up view of tube junction 12 configured without mixing pump 10. FIG. 4 additionally shows venturi 44 and nozzle 46. Because the return rate of clarifier sludge 36 (not shown) is lower than the return rate of basin sludge 22 (not shown), clarifier sludge 36 is preferably directed through venturi 44. Venturi 44 has a constricted point that increases the velocity of clarifier sludge 36, thereby increasing mixing with the greater volume of incoming basin sludge 22. Nozzle 46 is located at the point where the mixed sludge is released into denitrification chamber 6. Nozzle 46 further increases the velocity of the exiting sludge mixture, thereby facilitating mixing with the stream of incoming wastewater from wastewater influent conduit 8 and generating circulation and reducing particle settlement in denitrification chamber 6.

Figure 5:
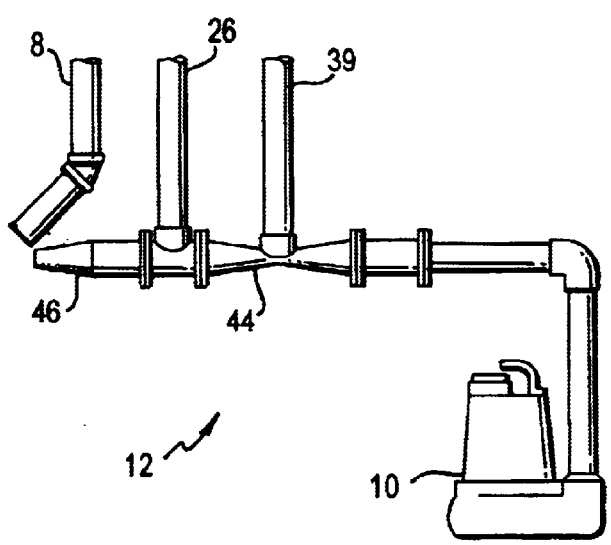
FIG. 5 is a perspective view of the tube junction configured with a mixing pump.

FIG. 5 is a close-up view of conduit junction 12 as configured with mixing pump 10. FIG. 5 shows a configuration of conduit junction 12 in which clarifier sludge conduit 39 (also referred to as the sixth conduit) has switched places with basin sludge conduit 26 with regard to proximity to nozzle 46 and mixing pump 10.

Figure 6:
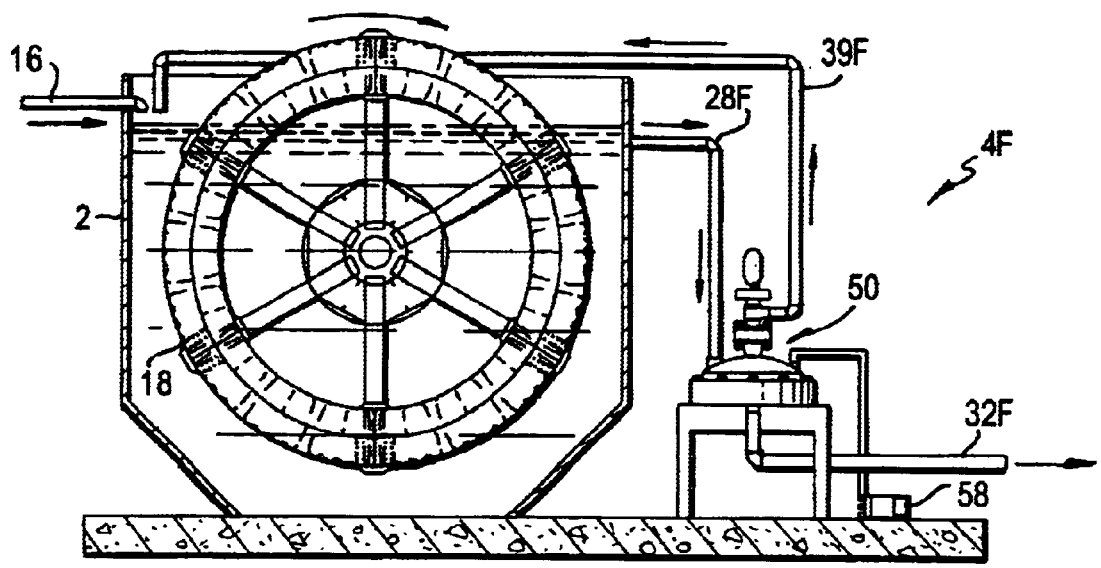
FIG. 6 is a cross-sectional side view of an aeration basin and filter apparatus.

FIG. 6 is a cross-sectional side view of aeration basin 2 and filter apparatus 4F. For simplicity, denitrification chamber 6 is not shown. Filter apparatus 4F, which can obviate the need for a separate return sludge pump 34, comprises constant backwash filter 50, influent conduit 28F (also referred to as the third conduit), effluent conduit 32F (also referred to as the fifth conduit), clarifier return sludge conduit 39F (also referred to as the sixth conduit) and air compressor 58. Note that in FIG. 6 clarifier sludge 36 (not shown) is returned to aeration basin 2. In other embodiments, it may instead be returned to denitrification chamber 6.

Figure 7:
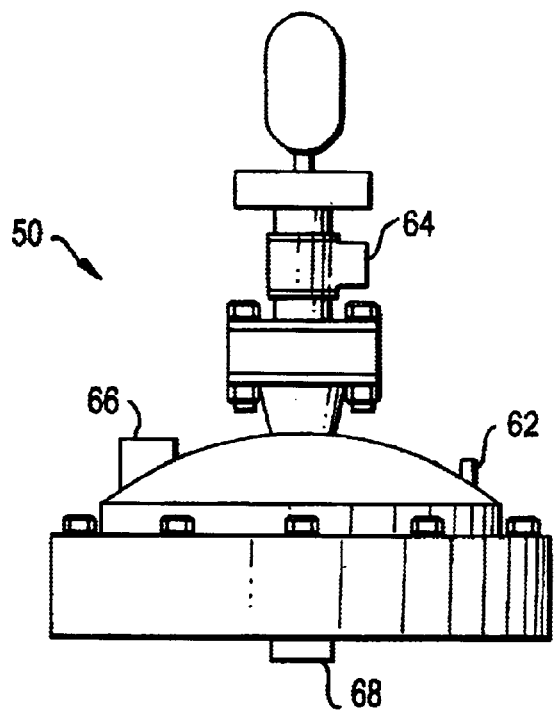
FIG. 7 is an enlarged view of a clarifying filter.

FIG. 7 is a close-up view of filter 50. FIG. 7 shows the inlet and outlet points of filter 50, specifically, compressed air inlet 62, sludge backwash outlet 64, influent inlet 66 and effluent outlet 68. Influent inlet 66 receives mixed liquor 14 from influent conduit 28F (not shown in FIG. 7). Compressed air inlet 62 receives compressed air from compressor 58 (not shown in FIG. 7). Sludge backwash outlet 64 connects to clarifier return sludge conduit 39F (not shown in FIG. 7). Effluent outlet 68 connects to effluent conduit 32F (not shown in FIG. 7).

The essential internal mechanisms of a preferred embodiment of filter 50 are disclosed in U.S. Pat. No. 5,128,029, issued to Herrmann Jul. 7, 1992, which is hereby incorporated herein. However, many other types of backwash filters will work.

The apparatus and method of the invention are further described as follows. The invention includes an aeration basin (e.g., an aeration tank or bio-tank), an aerating device (e.g., a fixed film aerator or rotary biological contact aerator), a denitrification chamber and a clarifying means, preferably a constant backwash filter. The aeration basin substantially contains sludge and waste, the mixture of which is referred to as mixed liquor.

The aerating device aerates the mixed liquor in the aeration basin. In more preferred embodiments, the apparatus and method can operate as a hybrid of activated sludge and fixed film processes to treat the mixed liquor. Approximately 75–80 percent of the treatment takes place in the activated sludge component and 20–25 percent takes place in the fixed film component. The combination of the two technologies takes advantage of the best aspects of both types of treatment. In such cases, the aerating device preferably comprises a rotary fixed film aerator with biological contact aerator cell segments. A most preferred type of fixed film aerator, known as a "Bio-Wheel™" (a trademark of Wastewater Technology Inc., Monterey, Va.), lacks external aerators, such as diffusers, that are present on typical fixed film aerators. Rather, the aerators are part and parcel of the Bio-Wheel™.

To facilitate denitrification, the present invention provides a denitrification chamber in which the amount of oxygen is severely limited. New waste, which typically contains little oxygen, enters the denitrification chamber where it is mixed with sludge returned from the aeration basin, preferably from a portion of it, such as a lower corner, that is far away from highly oxic mixed liquor. The sludge is returned from the aeration basin by means of a re-circulation pump. The rate of return for the sludge from the aeration basin is preferably equal to 2–4 times the influent flow of waste into the treatment apparatus. In a preferred embodiment, sludge is also returned to the denitrification chamber from the clarifier, preferably by means of a sludge return pump. This sludge also contains little oxygen. It is preferably returned at a rate of approximately 50–100 percent of the average influent flow of waste into the treatment apparatus. The re-circulation and sludge return pumps provide continuous return flow to the denitrifying tank, so that there is a continuous cycle of denitrification and nitrification. Repeated cycles increase the effectiveness of the process and also provide for organic phosphorous uptake through biological activity. By the above means, the oxygen content of the denitrification chamber preferably remains below 0.5 mg/L. By providing a fresh source of carbon with the influent, denitrifying bacteria can thrive.

The clarifying device may be a conventional clarifier or a filter. In either case, the clarifying means separates the solids and bacteria from the water, discharges the clear water and returns the solids to either the aeration basin or the denitrification chamber or both. Unlike a conventional clarifier, however, the filter needs little space. Further, the filter is not disturbed by movement. Also, the amount of sludge that is filtered can be controlled by the pressure and size of the openings in the filter, leading to better control. Thus, it may be possible to eliminate a tertiary filter from the treatment plant. The filter may also obviate the need for a separate clarifier sludge return pump. Thus, a filter is preferred.

The filter is preferably connected to the aeration basin like a typical clarifier. Wastewater passes from the aeration basin to the filter by gravity or pump, is then filtered and clean water is discharged. The sludge is returned either to the denitrification chamber or the aeration basin. When returned to the latter, compressed air may be injected into the filter to raise oxygen levels in the sludge or the effluent, or to prevent the formation of filamentous bacteria, which thrive in anoxic environments. Most preferably, the filter is a constant flow filter with continuous backwash. However, many other types of backwash filters will work.

In more preferred embodiments, the streams of return sludge from the clarifier and aeration basin are directed to conjoined tubes submersed in the denitrification chamber. The two streams mix together in the tubes and are forced out, preferably through a nozzle, into the stream of new waste influent coming out of an adjacent tube. Alternatively, the influent may mix together in the tubes with the return sludge streams before being directed out into the denitrification chamber. Optionally, the denitrification chamber also includes a mixing pump that mixes the two sludge returns with the incoming influent.

As influent flow increases the hydraulic loading and there is free access from one tank to another, effluent flow will match influent flow. In the event that influent flow ceases, as caused by typical diurnal loading of the waste treatment plant, nitrification and denitrification will proceed continuously.

Applications of the invention typically include: treatment of domestic and municipal waste from 2,000 gallons per day (GPD) to 2 million gallons per day (MGD); treatment of domestic waste containing industrial and manufacturing wastes; treatment and pre-treatment of high strength organic industrial waste; treatment of land fill leachate; combination with septic tanks and lagoons for improved nitrification and biological phosphorous removal; treatment of liquid manure in hog farms, feed lots and animal processing facilities; food processing operations; aerobic sludge stabilization; and aquaculture including fish farming in closed circuit systems.

It should be understood that the foregoing summary, detailed description, examples and drawings of the invention are not intended to be limiting, but are only exemplary of the inventive features that are defined in the claims. The invention is not limited to the embodiments shown since they can be modified by those skilled in the art without departing from the spirit and scope of the appended claims. For example, the aerating device may not be a rotary aerator-type device. Instead, an air pump may simply pump air into the aeration basin, thus causing aeration and agitation. Alternatively, a fluid pump or propeller may aerate the mixed liquor by throwing it up into the air above the aeration basin.

I claim:

1. A waste treatment apparatus comprising:
    a denitrification chamber capable of receiving waste and substantially containing sludge and said waste, said sludge and waste comprising a mixed liquor;
    an aeration basin capable of substantially containing the mixed liquor and including an aerating device for aerating the mixed liquor;
    a clarifying device comprising a filter apparatus capable of substantially containing the mixed liquor and of separating solid particles from the mixed liquor, resulting in sludge and discharge water, said filter apparatus including a constant flow backwash filter;
    a first conduit through which the denitrification chamber receives waste;
    a second conduit trough which the mixed liquor in the denitrification chamber may be discharged into the aeration basin;
    a third conduit through which the mixed liquor in the aeration basin may be discharged into the clarifying device;
    a fourth conduit through which settled sludge in the aeration basin may be discharged into the denitrification chamber;
    a fifth conduit through which the discharge water in the clarifying device may be discharged as effluent; and
    a sixth conduit through which the sludge from the clarifying device may be discharged into at least one of the denitrification chamber or the aeration basin; said sixth conduit comprising a nozzle.

2. The waste treatment apparatus of claim 1, further comprising a first pump capable of assisting the discharge of sludge through the fourth conduit.

3. The waste treatment apparatus of claim 2, wherein the first pump further comprises a floor sludge intake device capable of intaking settled sludge near an expanse of a floor of the aeration basin.

4. The waste treatment apparatus of claim 3, wherein the filter apparatus includes an air compressor.

5. The waste treatment apparatus of claim 4, wherein the air compressor is capable of generating pressure in the filter apparatus that assists the discharge of sludge through the sixth conduit.

6. The waste treatment apparatus of claim 5, wherein one end of the sixth conduit terminates in the aeration basin.

7. The waste treatment apparatus of claim 5, wherein one end of the sixth conduit terminates in the denitrification chamber.

8. The waste treatment apparatus of claim 7, wherein the fourth conduit and the sixth conduit meet at a junction.

9. The waste treatment apparatus of claim 8, wherein the sixth conduit is attached to the junction via a venturi.

10. The waste treatment apparatus of claim 9, further comprising a second pump capable of mixing sludge and waste in the denitrification chamber.

11. The waste treatment apparatus of claim 10, wherein the second pump is operably connected to the junction.

12. The waste treatment apparatus of claim 11, wherein the junction includes the nozzle and one end of the first conduit terminates within three feet of the nozzle.

13. The waste treatment apparatus of claim 12, wherein the aerating device comprises a rotary aerator.

14. The waste treatment apparatus of claim 3, further comprising both (a) fixed film and fixed film microorganisms and (b) activated sludge and activated sludge microorganisms.

15. The waste treatment apparatus of claim 1, further comprising a basin sludge return pump capable of assisting the discharge of sludge through the fourth conduit.

16. The waste treatment apparatus of claim 15, further comprising a clarifier sludge pump capable of assisting the discharge of sludge through the sixth conduit.

17. The waste treatment apparatus of claim 16, wherein the basin sludge return pump further comprises a floor sludge intake capable of intaking sludge near an expanse of a floor of the aeration basin.

18. The waste treatment apparatus of claim 17, wherein one end of the sixth conduit terminates in the aeration basin.

19. The waste treatment apparatus of claim 17, wherein one end of the sixth conduit terminates in the denitrification chamber.

20. The waste treatment apparatus of claim 19, wherein the fourth conduit and the sixth conduit meet at a junction.

21. The waste treatment apparatus of claim 20, wherein the sixth conduit is attached to the junction via a venturi.

22. The waste treatment apparatus of claim 21, further comprising a mixing pump capable of mixing sludge and waste in the denitrification chamber.

23. The waste treatment apparatus of claim 22, wherein the mixing pump is operably connected to the junction.

24. The waste treatment apparatus of claim 23, wherein the junction includes a nozzle and one end of the first conduit terminates within three feet of the nozzle.

25. The waste treatment apparatus of claim 24, wherein the aerating device comprises a rotary aerator.

26. The waste treatment apparatus of claim 25, further comprising both (a) fixed film and fixed film microorganisms and (b) activated sludge and activated sludge microorganisms.

27. The waste treatment apparatus of claim 26, wherein the clarifying device is a gravity clarifier.

28. A waste treatment apparatus comprising:
    a denitrification chamber capable of receiving waste and substantially containing sludge and said waste, said sludge and waste comprising a mixed liquor;
    an aeration basin capable of substantially containing the mixed liquor and including an aerating device for aerating the mixed liquor;
    a clarifying device comprising a constant flow backwash filter apparatus capable of separating solid particles from the mixed liquor, resulting in sludge and discharge water;
    a first conduit through which the denitrification chamber receives waste;
    a second conduit through which the mixed liquor in the denitrification chamber may be discharged into the aeration basin;
    a third conduit through which the mixed liquor in the aeration basin may be discharged into the clarifying device;
    a fourth conduit through which settled sludge in the aeration basin may be discharged into the denitrification chamber;

a fifth conduit through which the discharge water in the clarifying device may be discharged as effluent;

a sixth conduit through which the sludge from the clarifying device may be discharged into the denitrification chamber or the aeration basin;

a basin sludge return pump capable of assisting the discharge of sludge through the sixth conduit, wherein the basin sludge return pump comprises a floor sludge intake capable of intaking sludge near an expanse of a floor of the aeration basin;

a fixed film and fixed film microorganisms; and an activated sludge and activated sludge microorganisms.

29. A method for treating waste comprising:

directing waste through a first conduit into a denitrification chamber where the waste mixes with sludge to form a mixed liquor;

directing mixed liquor that has undergone denitrification in the denitrification chamber through a second conduit and into an aeration basin;

aerating the mixed liquor in the aeration basin by rotating a rotary aerator in the aerator basin;

directing aerated mixed liquor through a third conduit and into a clarifying device capable of separating solid particles from the mixed liquor;

directing sludge that collects in the aeration basin through a fourth conduit and into the denitrification chamber;

separating solid particles from the mixed liquor directed into the clarifying device to form recycled sludge and discharge water by constant flow backwash filtering;

directing the discharge waxer through a fifth conduit as effluent; and directing the recycled sludge through a sixth conduit and into at least one of the denitrification chamber or the aeration basin; and mixing together in the denitrification chamber incoming waste and the sludge directed out of the fourth and sixth conduit.

30. The method of claim 29, further comprising treating the waste with both (1) fixed film and fixed film microorganisms and (b) activated sludge and activated sludge micoorganisms.

31. The method of claim 30, further comprising pumping the sludge through the fourth conduit, pumping the sludge through the sixth conduit and mixing together in the denitrification chamber incoming waste and the sludge directed out of the fourth and sixth conduits.

32. The method of claim 29, further comprising directing at least a part of the recycled sludge through a sixth conduit into the aeration basin.

* * * * *

UNITED STATES PATENT AND TRADEMARK OFFICE
CERTIFICATE OF CORRECTION

PATENT NO. : 6,613,229 B2  Page 1 of 1
DATED : September 2, 2003
INVENTOR(S) : Donald D. Ricketts It is certified that error appears in the above-identified patent and that said Letters Patent is hereby corrected as shown below:

Column 10,
Line 4, "waxer" should read -- water --.

Signed and Sealed this

Thirteenth Day of June, 2006

JON W. DUDAS
*Director of the United States Patent and Trademark Office*